(12) United States Patent
Kuopanportti et al.

(10) Patent No.: US 9,861,931 B2
(45) Date of Patent: Jan. 9, 2018

(54) METHOD AND SYSTEM FOR RECOVERY OF CARBON DIOXIDE FROM GAS

(71) Applicant: MIKKELIN AMMATTIKORKEAKOULU OY, Mikkeli (FI)

(72) Inventors: Hannu Kuopanportti, Oulu (FI); Teijo Linnanen, Savonlinna (FI)

(73) Assignee: KAAKKOIS-SUOMEN AMMATTUKORKEAKOULU OY, Mikkeli (FI)

( * ) Notice: Subject to any disclaimer, the term of this patent is extended or adjusted under 35 U.S.C. 154(b) by 104 days.

(21) Appl. No.: 14/647,539

(22) PCT Filed: Dec. 3, 2013

(86) PCT No.: PCT/FI2013/051131
§ 371 (c)(1),
(2) Date: May 27, 2015

(87) PCT Pub. No.: WO2014/087051
PCT Pub. Date: Jun. 12, 2014

(65) Prior Publication Data
US 2015/0298051 A1    Oct. 22, 2015

(30) Foreign Application Priority Data
Dec. 7, 2012    (FI) ..................... 20126276

(51) Int. Cl.
*B01D 53/14*    (2006.01)
*B01D 53/24*    (2006.01)
(Continued)

(52) U.S. Cl.
CPC ..... *B01D 53/1475* (2013.01); *B01D 53/1425* (2013.01); *B01D 53/185* (2013.01);
(Continued)

(58) Field of Classification Search
None
See application file for complete search history.

(56) References Cited

U.S. PATENT DOCUMENTS

| 2006/0230933 A1 | 10/2006 | Harazim |
| 2012/0129246 A1* | 5/2012 | Fradette ............. B01D 53/1493 435/266 |
| 2013/0174566 A1 | 7/2013 | Birley et al. |

FOREIGN PATENT DOCUMENTS

| CA | 2812632 | * 4/2012 | ............. B01D 53/14 |
| JP | 2008-63393 | 3/2008 | |

(Continued)

OTHER PUBLICATIONS

Carbon Dioxide Capture Technology. Yongling Li et al. Energy Procedia 11 (2011) p. 2508-2515.
(Continued)

*Primary Examiner* — Daniel Berns
(74) *Attorney, Agent, or Firm* — Fildes & Outland, P.C.

(57) ABSTRACT

A method for recovering carbon dioxide from gas, which method includes the steps of:
  pressurizing gas,
  feeding pressurized gas and water used as a solvent to an absorption column to 3 to 10 bar absolute pressure,
  feeding water received from the absorption column and carbon dioxide absorbed therein to a desorption column for recovering carbon dioxide from the water,
  recirculating water exiting the desorption column to the absorption column,
  recovering carbon dioxide exiting the desorption column,
  feeding at least part of the gas to an auxiliary desorption column prior to pressurizing the gas, and
(Continued)

sending water exiting the desorption column back to the auxiliary desorption column.

The method also applies to a corresponding system.

14 Claims, 3 Drawing Sheets

(51) Int. Cl.
    *B01D 53/78*     (2006.01)
    *B01D 53/86*     (2006.01)
    *B01D 53/96*     (2006.01)
    *B01D 53/18*     (2006.01)
    *C01B 32/50*     (2017.01)

(52) U.S. Cl.
    CPC .......... *B01D 53/24* (2013.01); *B01D 53/869* (2013.01); *C01B 32/50* (2017.08); *B01D 2252/103* (2013.01); *B01D 2252/602* (2013.01); *B01D 2255/1021* (2013.01); *B01D 2255/1023* (2013.01); *B01D 2255/1025* (2013.01); *B01D 2255/1026* (2013.01); *B01D 2255/20753* (2013.01); *B01D 2256/22* (2013.01); *B01D 2256/245* (2013.01); *B01D 2257/504* (2013.01); *B01D 2258/0283* (2013.01); *Y02C 10/06* (2013.01)

(56) References Cited

FOREIGN PATENT DOCUMENTS

| | | |
|---|---|---|
| WO | 2007/009461 | 1/2007 |
| WO | 2009/132661 | 11/2009 |
| WO | 2012/052262 | 4/2012 |

OTHER PUBLICATIONS

Selection and Characterization of New Absorbents for Carbon Dioxide Capture. Sholeh Ma'mun. Doctoral Thesis (2005) Faculty of Natural Science & Technology, Dept. of Chem. Eng., NTNU, 132 pages.

Advanced Technology for the Capture of Carbon Dioxide from Flue Gases. Shrikar Chakravarti et al., First National Conference on Carbon Sequestration, May 15-17, 2001; Washington, D.C.

Adsorption of Carbon Dioxide on Alkali Metal Exchanged Zeolites, Emilio Munoz et al. (2006), 2006 Aiche Annual Meeting, Nov. 12-17, 2006, San Francisco, CA.

Advances in principal factors influencing carbon dioxide adsorption on zeolites, Danielle Bonenfant et al., Science and Technology of Advanced Materials 9 (2008), 013007, 7 pages.

The Production of Carbon Dioxide from Flue Gas by Membrane Gas Absorption, P.H.M. Feron et al., Energy Conyers. Mgmt vol. 38 (1997), p. 93-98.

Reducing the Cost of $CO_2$ Capture from Flue Gases Using Membrane Technology, Minh T. Ho et al., Ind. Eng. Chem. Res. 47 (2008) p. 1562-1568.

A survey of process flow sheet modifications for energy efficient $CO_2$ capture from flue gases using chemical Absorption, A. Cousins et al., Int'l Journal of Greenhouse Gas Control (2011) 15 pages.

Sulzer—reducing the energy penalty for post-combustion CO2 capture, Abhilash Menon et al., Carbon Capture Journal (2011) 23, p. 2-5.

Degradation and corrosivity of MEA with oxidation inhibitors in a carbon dioxide capture process, Young Lee et al., Journal of Chemical Engineering of Japan, Advance Publication, Jan. 20, 2012, 5 pages.

Progress in carbon dioxide separation and capture: A review, Hongqun Yang et al., Journal of Environmental Sciences 20 (2008), p. 14-27.

Post-combustion capture of $CO_2$ from coal-fired power plants in China and Australia: An experience based cost comparison, N. Dave et al., Energy Procedia 4 (2011), p. 1869-1877.

Thermodynamic analysis of high-ash coal-fired power plant with carbon dioxide capture, Sujit Karmakar et al., International Journal of Energy Research (2011), abstract.

Effects of NOx in the Flue Gas Degradation of MEA, Berit Fostas et al., Energy Procedia 4 (2011), p. 1566-1573

Biological treatment of amine wastes generated in post combustion $CO_2$ capture, Deshai Batheju et al., Energy Procedia 4 (2011), p. 496-503.

Amines Used in $CO_2$ Capture—Health and Environmental Impacts, Renjie Shao et al., Bellona Report, Sep. 2009, 49 pages.

Menetelmä hiilidioksidin talteenottamiseksi savukaasuista, Aho Yrjo. Patent application FI20085233, Sep. 19, 2009, 11 pages.

Concise Explanation of Menetelmä hiilidioksidin talteenottamiseksi savukaasuista, Aho Yrjo. Patent application FI20085233, Sep. 19, 2009.

Kaatopaikkakaasun puhdistaminen liikennepolttoaineeksi vastavirtavesiabsorptiolla, Jussi Lantela, Thesis, Feb. 28, 2007, including English language abstract.

Absorption of carbon dioxide in water under pressure using a gas-bubble column, G. Houghton et al., Chemical Engineering Science 7 (1957), p. 26-39.

Nickel nanoparticles catalyse reversible hydration of carbon dioxide for mineralization carbon capture and storage, Gaurav A. Bhaduri et al., Catalysis Science & Technology, 2013, 3, p. 1234-1239.

A parametric study of $CO_2/N_2$ gas separation membrane processes for post-combustion capture, Li Zhao et al., Journal of Membrane Science 325 (2008), p. 284-294.

Advances in $CO_2$ capture technology—The U.S. Department of Energy's Carbon Sequestration Program, Jose D. Figueroa et al., International Journal of Greenhouse Gas Control 2 (2008), p. 9-20.

Separation Fixation of Carbon Dioxide Using Polymeric Membrane Contactor, Zhikang Xu et al., First National Conference on Carbon Sequestration. May 15-17, 2001. Washington, D.C.

International Search Report in corresponding International application No. PCT/FI2013/051131, dated Mar. 24, 2014.

English language abstract of JP2008-63393.

* cited by examiner

METHOD AND SYSTEM FOR RECOVERY OF CARBON DIOXIDE FROM GAS

CROSS REFERENCE TO RELATED APPLICATION

This application claims the benefit of priority from International Patent Application No. PCT/FI2013/051131 filed on Dec. 3, 2013, which claims the benefit of priority from Finland Patent Application No. 20126276, both of which are incorporated by reference in their entirety.

TECHNICAL FIELD

The invention relates to a method for recovering carbon dioxide from gas, in which method
gas is pressurized,
pressurized gas and water used as a solvent are fed to an absorption column,
carbon dioxide absorbed in water received from the absorption column is fed to a desorption column for separating carbon dioxide from water,
water exiting the desorption column is recirculated to the absorption-column,
carbon dioxide exiting the desorption column is recovered.

The invention also relates to a corresponding system for recovering carbon dioxide from gas.

BACKGROUND OF THE INVENTION

One of the greatest environmental threats today is the continuous increase of carbon dioxide in the atmosphere. Some of the greatest man-made carbon dioxide emissions are caused by flue gases of power plants using fossil fuels (coal, natural gas, oil, peat). The rationale for the use of current recovery methods is not so much the climate change, but carbon dioxide is separated and purified from flue gases for industrial use and raw materials of industrial downstream processes.

According to a study by Li et al. 2011 (Li Yongling, Liu Yingshu, Zhang Hui & Liu Wenhai 2011. *Carbon dioxide capture technology. Energy Procedia* 11 (2011), p. 2508-2515.), the most important methods, currently at least in the pilot stage, for separating carbon dioxide from flue and process gases, are:

1) Chemical absorption in solutions, such as amine or hydroxide solutions [(Ma'mun Sholeh 2005. *Selection and characterization of new absorbents for carbon dioxide capture. Faculty of Natural Science and Technology Department of Chemical Engineering, Norwegian University of Science and Technology (NTNU), Doctoral thesis.* 132 p) and (Chakravarti Shrikar et al. 2001. *Advanced technology for the capture of carbon dioxide from flue gases. First National Conference on Carbon Sequestration, 15-17 May 2001, Washington, D.C. The National Energy Technology Laboratory (NETL).* 10 p.)], in liquids, such as ionic liquids, or in solid materials, such as carbonation of calcium or lithium, 2) Physical absorption in solutions or liquids, such as modified ionic liquids, 3) Adsorption on solid surfaces [(Munoz Emilio, Diaz Eva Ordonez Salvador & Vega Aurelio 2006. *Adsorption of carbon dioxide on alkali metal exchanged zeolites.* 2006 Aiche Annual Meeting, 12-17 Nov. 2006, San Francisco, Calif., paper 71.) and (Bonenfant Danielle et al. 2008. *Advances in principal factors influencing carbon dioxide adsorption on zeolites. Science and Technology of Advanced Materials* 9 (2008) 013007, 7 p.)], 4) Membrane separation processes [(Feron & Jansen A. E. 1997. *The production of carbon dioxide from flue gas by membrane gas absorption. Energy Convres. Mgmt* 38 (1997), p. 93-98.) and (Zhikang Xu et al. 2001. *Separation and fixation of carbon dioxide using polymer membrane contactor. First National Conference on Carbon Sequestration.* 15-17 May, 2001, Washington, D.C. The National Energy Technology Laboratory (NETL). 8 p.) and (Ho Minh T., Allinson Guy W. A. & Wiley Dianne E. 2008. *Reducing the cost of CO2 capture from flue gases using membrane technology. Ind. Eng. Chem. Res.* 47 (2008), p. 1562-1568.)] and 5) Cryogenic distillation.

The greatest challenge of separation methods is the high flow of flue or process gas, which increases the circulation rate of sorbents, equipment dimensions and energy consumption, for example. Problems are also created by the need and consumption of chemicals, their processing costs and, on the other hand, difficulties in scaling up. For example, the membrane method has so far been applied only on a small scale. The use of certain chemicals, such as amines, can cause adverse health and environmental effects.

The amine technology, based on chemical absorption, is the most commonly used method for producing carbon dioxide from flue gases for various industrial applications. In the amine-based absorption process, amine reacts with carbon dioxide to produce carbamates. In a typical amine-based absorption process, flue gas must first be cooled and impurities (particles, $SO_x$, $NO_x$) must be removed from it to obtain a tolerable level [Cousins A., Wardhaugh L. T. & Feron P. H. M. 2011. *A survey of process flow sheet modifications for energy efficient CO2 capture from flue gases using chemical absorption. International Journal of Greenhouse Gas Control* (2011), 15 p. (in press)]. Purified and cooled flue gas is blown through an absorption column in a countercurrent direction towards a lean amine solution. The columns are typically randomly packed columns, and their dimensions may be very large. In packed columns developed during recent years, it has been possible to minimize pressure drops during gas blowdown [Menon Abhilash & Duss Markus 2011. *Sulzer-reducing the energy penalty for post-combustion CO2 capture. Carbon Capture Journal* (2011) 23, p. 2-5.].

The use of the amine-based process is most of all limited by the heating costs of amine regeneration. Heating is carried out with water vapor at 3 bar minimum for which the specific energy consumption ranges from 3.8 to 5.3 MJ/kg $CO_2$, or from 1.1 to 1.5 MWh/t $CO_2$, and the consumption of electricity of pumps and fans ranges from 0.1 to 0.3 MWh/t $CO_2$, depending on the process [Lee Young, Kwak No Sang & Lee Ji Hyun 2012. *Degradation and corrosivity of MEA with oxidation inhibitors in a carbon dioxide capture process. Journal of Chemical Engineering of Japan, Advance Publication.* 20 Jan. 2012. 5 p.]. The steam consumption ranges between ¼ and ⅓ of the steam production of a coal-fired power plant [(Yang Hongqun, Xu Zhenghe, Fan Maohong, Gupta Rajender, Slimane Rachid B, Bland Alan E & Wright Ian 2008. *Progress in carbon dioxide separation and capture: A review. Journal of Environmental Sciences* 20(2008), p. 14-27.) and (Dave N., Do T., Palfreyman D., Feron P. H. M., Xu S. & Gao S. & Liu L. 2011. *Post-combustion capture of CO2 from coal-fired power plants in China and Australia, an experience based cost comparison. Energy Procedia* 4 (2011), p. 1869-1877.) and (Karmakar Sujit & Kolar Ajit Kumar 2011. *Thermodynamic* analysis of high-ash coal-fired power plant with carbon dioxide capture. International Journal of Energy Research (2011) (abstract))]. A major part of this steam is not available for power production. Impurities in flue gas and particularly oxygen contained in flue gas can cause corrosion and decomposition of chemicals. Impurities originating from flue gas and chemicals must be continuously removed from the amine solution.

A problem with the amine-based process is related to the environmental and health risks associated with it. Amines and their decomposition products may be toxic to man, animals and aquatic organisms. For example, decomposition products of amines, nitroamines [Fostås Berit, Gangstad Audun, Nenseter Bjarne, Pedersen Steinar, Sjøvoll Merethe & Sørensen Anne Lise 2011. Effects of NOx in the flue gas degradation of MEA. Energy Procedia 4 (2011), p. 1566-1573.] may cause cancer or pollute drinking water. All of the decomposition products of amines and their effects are not yet known. The effects depend on the amine type used [Botheju Deshai, Li Yuan, Hovland Jon, Haugen Hans Aksel & Bakke Rune 2011. Biological treatment of amine wastes generated in post combustion CO2 capture. Energy Procedia 4 (2011), p. 496-503.]. Amine emissions can be carried to the atmosphere or waterways in liquid or gaseous form. The estimated quantity of amine emissions ranges from 300 to 3000 t/a, whereas the amount of generating carbon dioxide is 1 Mt/a. [Shao Renjie & Stangeland Aage (Bellona Foundation) 2009. Amines used in CO2 capture—health and environmental impacts. Bellona Report, September 2009. 49 p.]

In physical absorption, carbon dioxide is dissolved in a solution or liquid at a high pressure and released by decreasing the pressure and/or increasing the temperature. Physical absorption is the most efficient when the absorption pressure is high and the temperature is low. In flue gases, the partial pressure of carbon dioxide is relatively low, generally between 5% and 15% in a flue gas at normal pressure. An absorption process based merely on a physical mechanism requires pressurization of gas to achieve good absorptive capacity. The lower the pressure at which absorption can be carried out, the smaller the requirement of electricity-consuming pressurization energy. In flue gas pressurization, more than 80% of energy is consumed for nitrogen pressurization. Solutions used in physical absorption include (poly)propylene carbonate (PC), methanol, N-formylmorpholine and N-acetylmorpholine (NAM) (product name Morphysorb®), N-alkylpyrrolidone, such as N-methylpyrrolidone (NMP), sulfolane, polyethylene glycol ethers (e.g. Selexol®), glycerols, e.g. glycerol carbonate and liquid carbon dioxide [Aho Yrjö 2009. Menetelmä hiilidioksidin talteenottamiseksi savukaasuista. Patent application FI20085233, 19 Sep. 2009. 11 p.].

The physical absorption process is today used in applications in which the partial pressure of carbon dioxide is high, for example, in natural gas purification. In physical absorption, carbon dioxide does not react with the solvent; therefore, solvent regeneration is easier than in chemical absorption.

Equipment used in the thesis (2007) of Jussi Lähtelä "Kaatopaikkakaasun puhdistaminen liikennepolttoaineeksi vastavirtavesiabsorptiolla" is also known as prior art, wherein an absorption column based on the countercurrent principle and desorption are used for separating carbon dioxide from biogas. In physical absorption, water is used as the solvent in the absorption column. Due to the poor absorptive capacity of water, the supply pressure of biogas fed to the absorption column must be increased to a remarkably high level. With increasing pressure, the solubility of carbon dioxide in water increases and thus the efficiency of absorption increases. However, the operating costs of the process increase at the same time. In the desorption column, carbon dioxide and other gases dissolved in water are separated from water and released into the atmosphere. The equipment used in Lähtelä's thesis is not designed for the recovery of carbon dioxide, and neither can it be economically used for this purpose.

SUMMARY OF THE INVENTION

The object of the invention is to provide a method for recovering carbon dioxide from gas which is more economical and environmentally friendly compared to prior art methods. The method according to this invention is characterized by a method for recovering carbon dioxide from gas, which method comprising steps of: pressurizing gas, feeding pressurized gas and water used as a solvent to an absorption column to 3 to 10 bar absolute pressure, feeding water received from the absorption column and carbon dioxide absorbed therein to a desorption column for recovering carbon dioxide from the water, recirculating water exiting the desorption column to the absorption column, recovering carbon dioxide exiting the desorption column, feeding at least part of the gas to an auxiliary desorption column prior to pressurizing the gas, and sending water exiting the desorption column back to the auxiliary absorption column. Another object of the invention is to provide a system for recovering carbon dioxide from gas which is more economical and environmentally friendly compared to prior art systems. The system according to this invention is characterized by a system for recovering carbon dioxide from gas, the system comprising: pressurization means hr pressurizing gas, an absorption column for absorbing carbon dioxide in water, a desorption column for desorbing carbon dioxide from water, means for recirculating the water coming from the desorption column back to the absorption column, recovery means for recovering carbon dioxide, wherein the system further comprising an auxiliary desorption column located upstream of the pressurization means for separating gases from water and recirculating the carbon dioxide absorbed in water exiting the desorption column back to the absorption column.

The object of the method according to this invention can be achieved with a method in which gas supplied to an absorption column is pressurized to 3-10 bar absolute pressure, preferably a minimum of 4 bar, and at least part of the gas is fed to an auxiliary desorption column before pressurizing the gas. Water used as the solvent is fed to the absorption column, and water and carbon dioxide absorbed therein, received from the absorption column, are first fed to a preliminary desorption column, and the gas exiting therefrom is sent back to the auxiliary desorption column. From the preliminary desorption column, water that has absorbed carbon dioxide is delivered to the desorption column for separating carbon dioxide from water. Thereafter, water exiting the desorption column is recirculated back to the absorption column via the auxiliary desorption column, and the carbon dioxide exiting the desorption column is recovered. With the use of an auxiliary desorption column, according to the partial pressure of carbon dioxide, carbon dioxide can be made desorb from the circulation water to the countercurrent flue gas flow, when the partial pressure of carbon dioxide is lower in the auxiliary desorption column compared to the desorption step. With such a method, recovery of carbon dioxide can be economically carried out without using environmentally harmful chemicals. In context of this application, pressure levels always refer to absolute pressure, unless otherwise indicated.

Advantageously, the entire cleaned flue gas flow is delivered via the preliminary desorption column; thus, the $CO_2$ partial pressure difference between flue gas and circulation water can be kept at a high level in the preliminary desorption column over their countercurrent flow distance, which accelerates desorption in the preliminary desorption column.

Advantageously, carbon dioxide absorbed in water, received from the absorption column, is fed to the preliminary desorption tank, and gas received from the top thereof is delivered back to the auxiliary desorption column. In preliminary desorption, carbon dioxide is released from water at a lower carbon dioxide content than in the actual desorption. This method can be used to increase the carbon dioxide content of gas releasing during desorption.

Advantageously, the gas to be purified, i.e. the feed gas of the process, is flue gas, but the method is also suitable for use for recovering carbon dioxide from other feed gases, such as various process gases, natural gas or similar.

According to an advantageous embodiment, the gas supplied to the process is flue gas of a power plant.

Advantageously, gas supplied to the auxiliary desorption tank is cleaned in a gas condensation and cleaning tank, whereupon a major part of (sulfurous) gas components easily dissolving and reacting with water remains in the cleaning water.

Carbon dioxide exiting the desorption column can be liquefied and distilled for recovery, in which case its carbon dioxide content can be increased and it can be brought to a volume reasonable for storing.

Absolute pressure applied in the preliminary desorption tank may range from 1.3 to 4.0 bar, preferably from 1.5 to 2.5 bar. At such a pressure, a major part of nitrogen contained in gases is separated from water, while the main part of carbon dioxide remains in water.

Absolute pressure applied in the desorption column may range from 0.2 to 1.1 bar, preferably from 0.3 to 0.8 bar, at which carbon dioxide is efficiently desorbed from water used as the solvent.

Absolute pressure applied in the auxiliary desorption column may range from 0.9 to 1.2 bar, preferably from 1.0 to 1.1 bar. At such a pressure in the auxiliary desorption column, it is possible to efficiently transfer (strip) the carbon dioxide remaining in the circulation water to gas and partially improve the efficiency of absorption and increase the concentration of the gas product.

Advantageously, the auxiliary desorption column is based on so called countercurrent desorption.

Advantageously, circulation water is continuously recirculated in the method via the absorption and desorption steps so that the total quantity of the circulation water can be kept reasonably low.

According to an embodiment, gas discharged from the top of the absorption column is delivered to a gas turbine for recovering the pressure energy. The pressure energy of gas discharged in this way can be utilized, for example, for pressurizing the gas sent to the absorption column.

In the method, it is possible to use a metal catalyst in the absorption and desorption steps to accelerate hydration, wherein the metal catalyst used is one of the following: Pd, Pt, Rh, Ni or Ru. The use of a metal catalyst accelerates the absorption of carbon dioxide in the circulation water and the desorption of it therefrom.

Conical nozzles can be used in the method to create a momentary vacuum pulse in the circulation water flow in the desorption column. Vacuum pulses in the supply to the desorption column improve uniform distribution of circulation water in the desorption column. Conical nozzles also improve uniform distribution of circulation water to the desorption column.

Spiral nozzles can be used in the method for uniform distribution of circulation water in the absorption column. More efficient distribution of circulation water improves absorption.

In the bottom of the absorption column, a disintegration technique implemented with a membrane can be used to disintegrate gas to bubbles. This also improves absorption.

A steam turbine can be used in the method to assist or replace the electric motor used for generating the driving energy of gas compressors. This enables utilization of various energy sources for generating the driving energy of the gas compressor.

A fan can be used in the method at the supply of gas to the auxiliary desorption column. A fan can improve the gas supply to the suction side of the gas compressor.

A centrifugal classifier can be used in the method in the separation of carbon dioxide prior to the supply to the absorption column. The use of a centrifugal classifier improves the energy economy of the method.

The gas to be purified may comprise nitrogen from 75% to 80% by mole, preferably from 78% to 79% by mole. Water absorption is particularly efficient when purifying such a gas. The feed gas used for the separation of carbon dioxide may comprise carbon dioxide, for example, from 12% to 15% by volume. When separating carbon dioxide from such a gas, the method according to the invention is also useful and efficient. The more the gas supplied contains carbon dioxide, the better the absorption of carbon dioxide in the circulation water.

The object of the system according to the invention can be achieved with a system including pressurization means for pressurizing gas, an auxiliary desorption column located upstream of the pressurization means for separating gases from water and recirculating water exiting a desorption column back to an absorption column, and an absorption column for absorbing carbon dioxide in water. Further, the system includes a desorption column for desorbing carbon dioxide from water. In addition, the system includes means for recirculating water coming from the desorption column back to the absorption column, and recovery means for recovering carbon dioxide.

Advantageously, the system includes a preliminary desorption tank located downstream of the absorption column for separating the carbon dioxide absorbed in water from the water, and recirculation means for recirculating the gas separated in the preliminary desorption tank back to the auxiliary desorption column. In preliminary desorption, carbon dioxide is released from water at a lower carbon dioxide content than in the actual desorption. In this way, it is possible to increase the carbon dioxide content of gas releasing during desorption.

Advantageously, the absorption column is a bubble column. In a bubble column, absorption of carbon dioxide in water is efficient, among other things, due to the large boundary surface area between water and gas containing carbon dioxide, since absorption in a bubble column is based on a countercurrent flow of bubbles and water in the absorption column, i.e. so called countercurrent absorption.

Advantageously, the system includes a gas condensation and cleaning tank located upstream of the auxiliary desorption column, which gas condensation and cleaning tank can be used to remove a major part of the (sulfurous) gas components easily dissolving and reacting with water.

The system may include a liquefaction tank for liquefying gaseous carbon dioxide. With liquefaction, carbon dioxide can be brought to a volume that is reasonable for storing.

According to an embodiment, the preliminary desorption tank and the desorption column are located at a level higher than the tops of the absorption column and the auxiliary desorption column, for utilizing the hydrostatic pressure difference. In this way, it is possible to utilize the rise of the gaseous fraction and the hydrostatic pressure of the liquid fraction.

The absorption column may include gas baffle plates for preventing turbulence. The use of a baffle plate improves absorption.

The preliminary desorption tank may include a dividing wall for removing bubbles from the circulation water before sending the circulation water to the desorption column. The use of a dividing wall improves desorption.

Packing elements may be included within the desorption column and/or the absorption column, which packing elements are ring pall type packing elements. Packing elements increase the liquid surface area between gas and liquid.

Conical nozzles may be included in the desorption column for creating a momentary vacuum pulse in the circulation water flow. The use of nozzles can also improve uniform distribution of circulation water in the desorption column.

The absorption column may include spiral nozzles for uniform distribution of circulation water. Uniform distribution of circulation water improves absorption.

A gas disintegrator implemented with a membrane may be present in the bottom of the absorption column for disintegrating gas to bubbles. Efficient disintegration of gas to bubbles improves absorption.

The system may include a steam turbine for ensuring generation of driving energy for gas compressors. A steam turbine can be used to utilize the steam pressure, for example, to generate the driving energy for gas compressors in case of electric motor failures.

The system may include a fan for feeding gas to the auxiliary desorption column. In this way, it is possible to improve the supply of gas to the gas compressor suction side.

The system may include a centrifugal classifier located upstream of the absorption column for separating carbon dioxide and pressurizing it before the supply to the absorption column. A centrifugal classifier can improve the energy economy of the method.

In terms of carbon dioxide separation, the most important criteria in selecting the solvent are: high solubility of carbon dioxide and its good selectivity relative to the nitrogen and oxygen gases. Other criteria include easy desorptivity, low steam pressure, and low solvent price, friendliness to the environment, and stability. Although water meets all of the conditions mentioned above with the exception of high solubility, according to the literature, its suitability has hardly been studied at all. In similar conditions, the solubility of carbon dioxide in water is almost 100-fold compared to the solubility of nitrogen. The use of the method has been restricted by the relatively low absorptive capacity of water. Thus, in water absorption based on closed water circulation, the amount of circulation water becomes high, because the carbon dioxide content of gas is relatively low (normally <15% by volume or 20% by mass). Due to this, energy consumed in pumping and compressing may become a factor that limits the use of the method. However, water is a natural solvent for the recovery of $CO_2$ in many carbon dioxide applications, such as the paper production process in which water is used abundantly.

The method according to the invention aims at producing almost pure carbon dioxide from gas. The absorption liquid is water, which does not cause adverse effects on the equipment or the environment. In the method according to the invention, gas can be conveyed through water cleaning before the actual carbon dioxide separation process, at which a major part of (sulfurous) gas components easily dissolving and reacting with water remains in the cleaning water. Generally, about 95% of $NO_x$ gases contained in flue gas is nitrogen oxide NO, the water solubility (at 25° C.) of which as pure gas is 0.058 g/l, whereas the solubility of pure carbon dioxide is 1.5 g/l. Due to this, a major part of NOx gases contained in flue gases is discharged from the separation process in the top part of the absorption column along with the nitrogen gas.

The product obtained with the method according to the invention can be directly used in industrial downstream processes as gas or, with compression, as liquid. The method is suitable for producing precipitated calcium carbonate, a filler material for paper, directly on the fiber surfaces in an in-line process. Another application may be greenhouses using carbon dioxide as a fertilizer. With the method, it is possible to produce pure gas containing very little NO gases, suitable for growing. In addition, warm water generating during cooling of the gas can be used, for example, for heating greenhouses.

So far, recovery of carbon dioxide, for the mere purpose of storing it in soil, has been carried out on a small scale; however, it has been utilized, for example, in connection with oil drilling. Thus, the method is a carbon dioxide separation and enrichment process, which can be utilized in the recovery of carbon dioxide.

BRIEF DESCRIPTION OF THE DRAWINGS

The invention is described below in detail by making reference to the attached drawings illustrating some of the embodiments of the invention, in which.

The reference numbers used in the figures refer to the following:

| | |
|---|---|
| A | gas condensation and cleaning step |
| B | carbon dioxide separation step |
| C | carbon dioxide distillation and cleaning step |
| 10 | system |
| 12 | cleaned gas |
| 12' | flue gas |
| 14 | absorption column |
| 16 | absorption column bottom |
| 20 | absorption column top |
| 22 | carbon dioxide absorbed in water |
| 24 | desorption column |

| | |
|---|---|
| 26 | desorption column bottom |
| 28 | desorption column top |
| 32 | preliminary desorption tank |
| 34 | preliminary desorption tank top |
| 36 | auxiliary desorption column |
| 40 | pressurization means |
| 42 | recirculation means |
| 44 | carbon dioxide recovery means |
| 45 | compressor |
| 46 | recirculation means |
| 50 | bubble column |
| 52 | gas condensation and cleaning tank |
| 53 | discharge water |
| 54 | circulation water cooler |
| 56 | compressor |
| 58 | gas turbine |
| 59 | heat exchanger |
| 60 | circulation water pump |
| 62 | discharge gas |
| 64 | cooling medium tank |
| 66 | condensation water tank |
| 68 | carbon dioxide precooler |
| 70 | carbon dioxide liquefaction tank |
| 72 | cooling aggregate |
| 74 | liquid carbon dioxide |
| 76 | packing element |
| 78 | packing element |
| 80 | gas fraction discharged from the auxiliary desorption |
| 82 | pressurized gas fraction supplied to the absorption column |
| 84 | liquid fraction discharged from the auxiliary desorption column |
| 86 | liquid fraction discharged from the auxiliary desorption column |
| 87 | gas fraction discharged from the absorption column |
| 88 | liquid fraction discharged from the absorption column |
| 90 | gas fraction discharged from the preliminary desorption tank |
| 92 | liquid fraction discharged from the preliminary desorption tank |
| 94 | gas fraction discharged from the desorption column |
| 96 | returning condensate water flow |
| 98 | non-liquefied gas fraction from carbon dioxide liquefaction |
| 100 | cleaned gas flow |

DETAILED DESCRIPTION OF THE INVENTION

Figure 1:
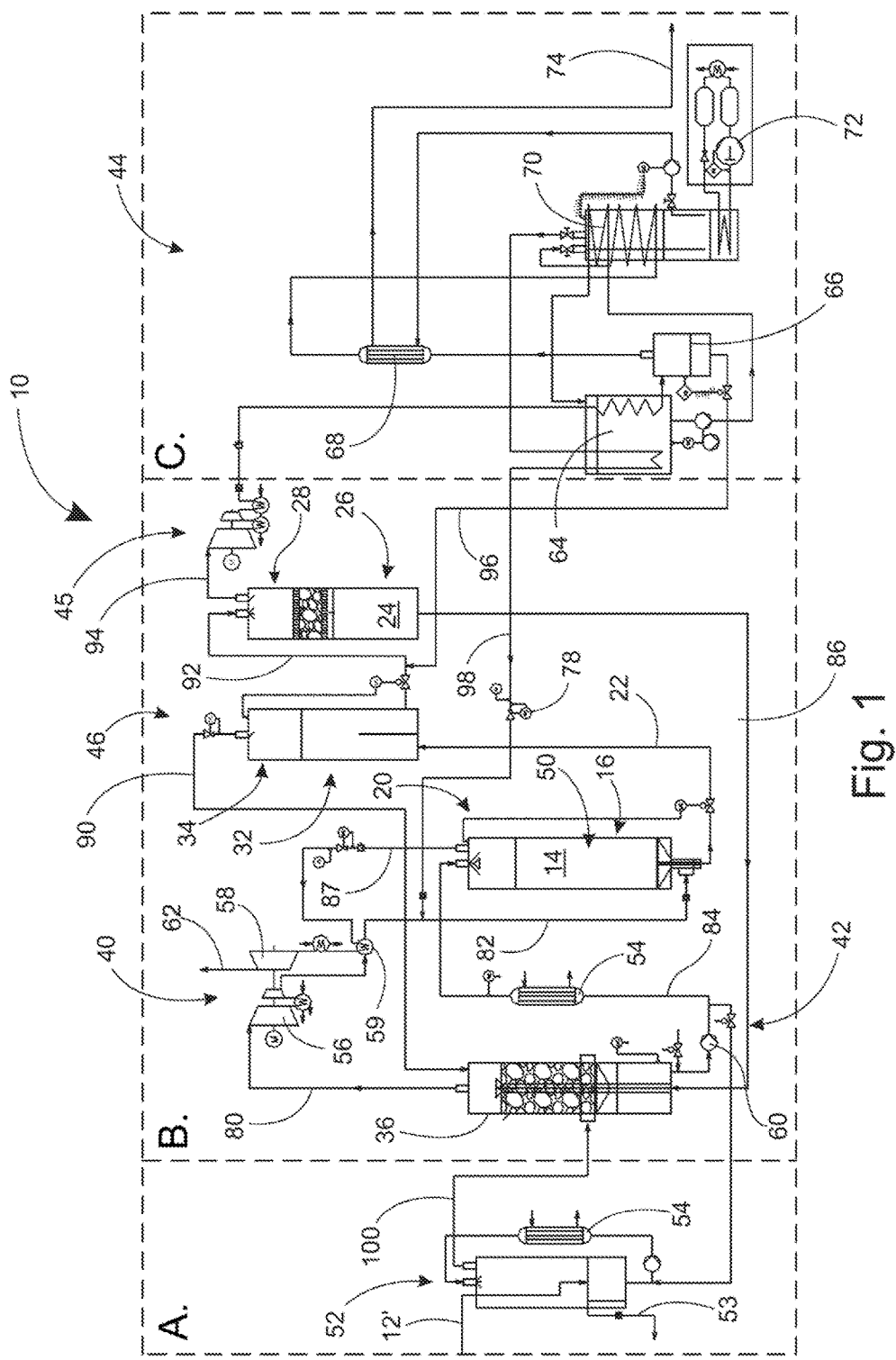
FIG. 1 is a process chart showing the system according to the invention.

FIG. 1 shows the process chart of the system according to the invention. The total process is advantageously composed of three steps: a condensation and cleaning step A of flue gases 12', a carbon dioxide separation step B, and a carbon dioxide distillation and liquefaction step C. In step A, gaseous gases are cleaned with water, at which a major part of (sulfurous) gas components easily dissolving and reacting with water remains in the cleaning water. In step B, carbon dioxide is separated from the other gases based on physical water absorption, and finally in step C, carbon dioxide separated from water is recovered in liquid form. In this patent application, the figures particularly refer to a process with which carbon dioxide can be recovered from flue gases of a power plant.

The system 10 according to the invention includes an auxiliary desorption column 36, an absorption column 14, a preliminary desorption tank 32, and a desorption column 24, as obligatory components. With these, carbon dioxide can be efficiently and economically separated from the other gases in such a way that carbon dioxide can be economically recovered in liquid form in a distillation step following these steps.

In the process shown in FIG. 1, carbon dioxide advances from left to right; i.e. flue gas 12' is supplied to the left-hand side and liquid carbon dioxide 74 is discharged from the right-hand side. Advantageously, the carbon dioxide recovery process starts with gas condensation and cleaning, which takes place in a condensation and cleaning tank 52 of gases. With the cleaning process, a major part of (sulfurous) gas components easily dissolving and reacting with water is separated to the cleaning water. From the condensation and cleaning tank 52, the cleaned gas is sent to the auxiliary desorption column 36. The auxiliary desorption column 36 may be a packed column, wherein gases are separated from the liquid flow coming from the latter process steps and wherein the gas flows coming from the latter process steps are combined.

From the auxiliary desorption column 36, the gas flow containing the gases is delivered to pressurization means 40. The pressurization means 40 may be composed of a compressor 56 which pressurizes the gas flow. Pressurized flow is fed to the absorption column 14, to the bottom 16 thereof. The absorption column 14, operating according to the countercurrent principle, is advantageously a bubble column 50, to which water is supplied as the solvent, to the top thereof. Water can be supplied to the absorption column 14 from the bottom of the auxiliary desorption column 36. Advantageously, water supplied to the absorption column is cooled with a circulating water cooler 54, which improves the absorptive capacity of water.

Advantageously, the pressure applied in the absorption column 14 ranges from 3 to 10 bar absolute pressure, preferably a minimum of 4 bar. Gas supplied to the absorption column 14 is pressurized to this pressure. At such a pressure, the energy consumption of the process becomes advantageous in terms of the specific energy consumption of the total process. The gas dissolving in water is mainly carbon dioxide, whereas a major part of the other gases, such as N2, ends up in the gas fraction 87 discharged from the top of the absorption column. The gas fraction 87 can be sent to a gas turbine 58, which recovers the pressure energy contained in the gas fraction. Prior to the supply to the turbine, the temperature of the discharge gas can be increased in the heat exchanger 59 with gas that has warmed up in the compressor 56 and with hot gas taken to the process at the heat exchanger. Heat increases gas expansion in the turbine increasing the output obtained from the turbine. Advantageously, the gas turbine 58 drives the compressor 56 of the pressurization means 40.

Carbon dioxide 22 absorbed in water from the absorption column is removed as the bottoms product and sent to the preliminary desorption tank 32. In the preliminary desorption tank 32, the pressure is kept at a level ranging from 1.3 to 4.0 bar, preferably from 1.5 to 2.5 bar absolute pressure. At such a pressure, nitrogen gas desorbs from water proportionally more or faster than carbon dioxide. The gas fraction 90 received from the top of the preliminary desorption tank 32, i.e. part of carbon dioxide and nitrogen dissolved in the circulation water, is returned to the auxiliary desorption column 36, wherein it is combined with the flow of incoming cleaned gases 100. Thus, the carbon dioxide desorbing in the preliminary desorption tank 32 can be again recovered in the absorption column 14, which partly increases the $CO_2$ content of the gas product. The purpose of returning the preliminary desorption gas is to increase the carbon dioxide content of the gas product releasing from the actual desorption and to improve the efficiency of absorption. Dividing desorption into three desorption steps, i.e. preliminary desorption, desorption and auxiliary desorption, may increase the carbon dioxide content of the gas product. The effect of the mere preliminary desorption in this series can increase the carbon dioxide content of gas releasing from desorption by about 3% to 7% by volume. Dividing desorption into three desorption steps, i.e. preliminary desorption, desorption and auxiliary desorption, increases the carbon dioxide content of the gas product and the recovery rate of carbon dioxide in the total process.

The liquid fraction 92 discharged from the preliminary desorption tank is delivered to the top 28 of the desorption column 24. The desorption column 24 may be a packed column, wherein the packing elements 78 increase the surface area between water and gas during the downflow of water. In the desorption column 24, it is strived to release all of the supersaturated carbon dioxide from water as far as possible applying suitable absolute pressure, from 0.2 to 1.1 bar, preferably from 0.3 to 0.8 bar. The carbon dioxide content of water at the bottom of the desorption column should be as close as possible to the desorption pressure equilibrium with the gas in the bottom section. The carbon dioxide fraction separated from water is taken from the top 28 of the desorption column 24 and delivered to the recovery means 44.

Water coming from the bottom 26 of the desorption column 24 and the $CO_2$ residue remaining therein are returned with the circulation water to the auxiliary desorption column 36 at 1 bar pressure. The volumetric flows of gases (mainly carbon dioxide) returned from the circulation water are small compared to the gas feed flow and their effects on the load of the absorption column are relatively small. The object of the auxiliary desorption column is to transfer (strip) carbon dioxide remaining in the circulation water to gas and partially improve the efficiency of absorption and increase the concentration of the gas product. In other words, the purpose of the auxiliary desorption column is to function as a post-desorption step. In addition, the water circulation used in the process becomes substantially closed.

A slight vacuum, i.e. from 0.3 to 0.8 bar absolute pressure, applied in desorption is also an important parameter affecting efficiency. When assessing an industrial scale process based on the flue gas of a normal power plant with a circulation water flow rate of 1.3 $m^3$/s and absorption pressure of 4.5 bar, the specific energy consumption of the process achieves the minimum, about 0.35 MWh/t $CO_2$ (circulation water temperature 5° C.), when the desorption pressure is 0.4 bar. The minimum specific energy consumption in the recovery (MWh/t $CO_2$) depends on the concentration of the supply gas used, the process conditions and the operating efficiencies of the machines, and can therefore be separately assessed for each operating situation.

As the first part, the recovery means 44 include a compressor 45, with which the carbon dioxide fraction exiting the desorption column 24 is pressurized, generating at the same time the vacuum required by desorption in the desorption column 24. The carbon dioxide fraction pressurized is delivered, via the cooling medium tank 64, to the condensate water tank 66, wherein water remaining in the carbon dioxide fraction condenses. Condensed water is sent back to the supply of the desorption tank 24. From the condensate water tank 66, the carbon dioxide fraction is delivered further to precooling 68 and therethrough to the liquefaction tank 70, which is cooled by means of the cooling aggregate 72. In the liquefaction tank 70, cooled carbon dioxide is liquefied and non-condensed gas fractions are sent back to the supply of the absorption column 14. Liquid carbon dioxide 74 can be used for precooling 68 taking place upstream of the liquefaction tank 70, after which it can be recovered for possible further processing.

The method according to the invention is based on physical absorption of carbon dioxide in water. In the absorption of carbon dioxide containing gas taking place in the absorption column, carbon dioxide is first carried along with gas to the boundary surface of gas and liquid, then to the relatively stable liquid film through the boundary surface, and further from the film deeper to the liquid phase. This last transfer stage results from the movement of molecules relative to each other, i.e. diffusion, and is also due to the effect of micro-movements of the liquid; in other words, it is realized as convective transfer caused by microturbulence. Diffusion can be accelerated either by increasing the temperature and the driving force of diffusion, i.e. the concentration difference, by bringing a small content of water to the vicinity of the liquid film, or by increasing the gas pressure, which increases the gas phase concentrations.

On the other hand, increasing the temperature reduces the absorptive capacity of water per volume unit. However, the ability of water to bind carbon dioxide molecules remarkably improves due to the effect of decreased temperature, particularly when approaching the freezing point of water. Despite decelerated diffusion, it is advisable to carry out absorption at a temperature as low as possible. Convective transfer can be accelerated by increasing the speed difference between gas and liquid. Furthermore, the transfer speed can be raised by increasing the boundary surface area between gas and liquid, for example, by mixing gas in the liquid in smaller bubbles. Reducing the bubble size strengthens and seals the boundary surface, but, as the total effect, the absorption speed clearly increases by reducing the bubble size.

With efficient mixing, absorption achieves a saturation state almost conforming to Henry's law in less than two seconds. In clean water (pressure 1 bar), the absorption rate increases from 1.5 g $CO_2$/kg of water to 2.7 g $CO_2$/kg of water, when the temperature decreases from 25° C. to 5° C. At 5° C., if absolute pressure is increased from 1 bar to 5 bar (approx. 4 atm), the absorption rate increases to 13.4 g $CO_2$/kg of water.

Figure 2:
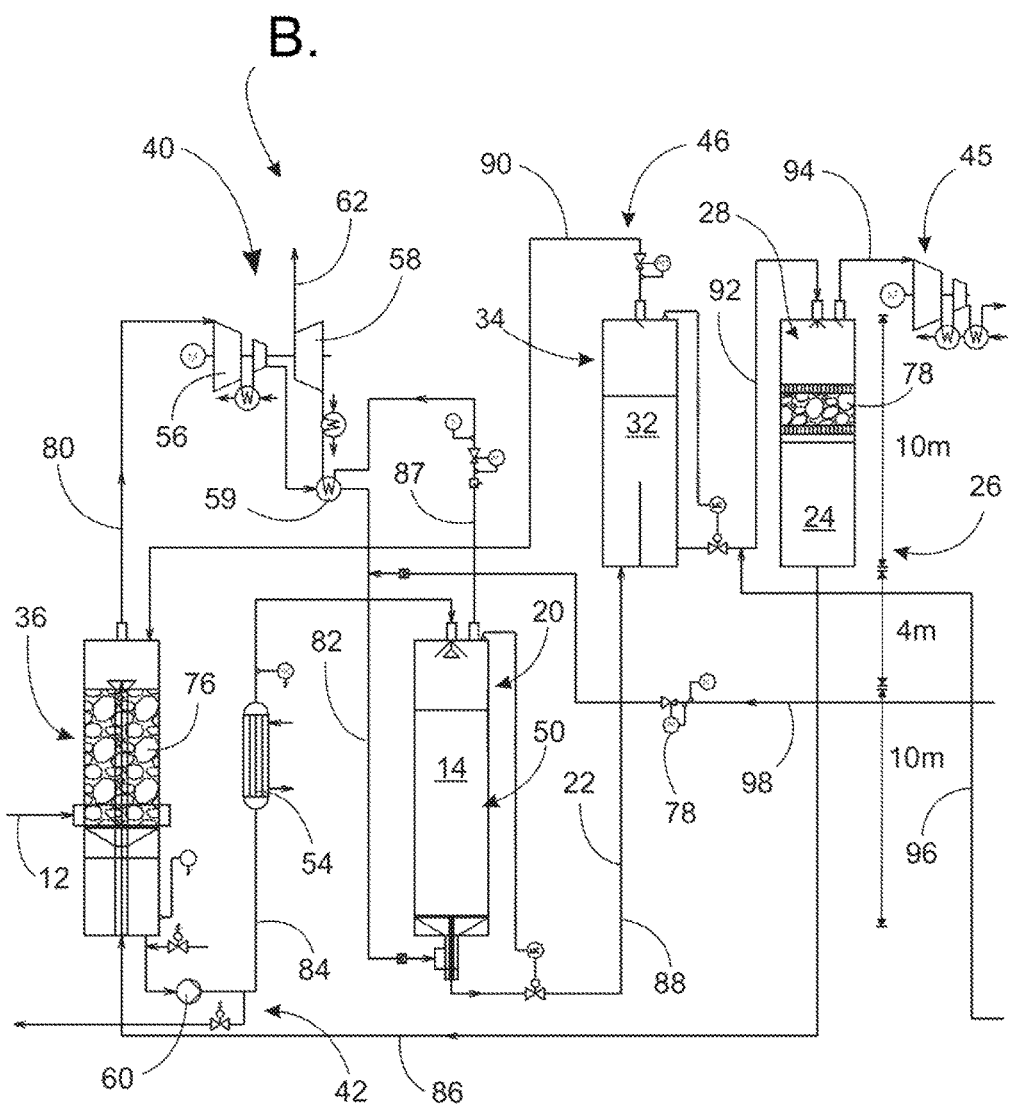
FIG. 2 shows a sub-process of the system according to the invention, wherein carbon dioxide is separated from water.

Advantageously, the column used as the absorption column is a bubble column 50 according to FIG. 2, which is well suited as absorption equipment for carbon dioxide. In a bubble column, gas and liquid are in countercurrent, the column internal design is simple (packing elements are not needed) and pressure losses caused by flow resistances remain small. In a bubble column, the liquid around the bubble is continuously renewed and thus the contact time is short in flow conditions and the penetration distance of gas is short during the contact time due to the slow diffusion speed. When the relative speed of gas and liquid increases, the absorption speed can be expected to increase, because increased turbulence in the vicinity of the liquid film increases the diffusion speed. On the other hand, excessive turbulence may reduce the total efficiency of absorption by equalizing the differences in the carbon dioxide concentration in the vertical direction of the column. Impurities, which increase the viscosity of liquid and reduce undulation of the liquid film, may decelerate the absorption speed.

In the method and system according to the invention, a mixing reactor can also be used wherein basically a similar phenomenon also occurs. In a mixing reactor, material transfer takes place even remarkably faster than in a bubble column. However, the use of a mixing reactor decreases the total economy of the method, because dispersing the gas into a large amount of water, required by water absorption, consumes a lot of energy. In terms of process technology, absorption can also be carried out in a countercurrent packed column, but the material transfer is not as efficient and the equipment dimensions increase. According to Houghton et al. [Houghton G., McLean A. M. & Ritchie P. D. 1957. *Absorption of carbon dioxide in water under pressure using a gas-bubble column. Chemical Engineering Science* 7 (1957), p. 26-39.], the absorption speed in a bubble column is 3 to 10 times higher, depending on the conditions, compared to a packed column. For the same absorption rate, the volume of the bubble column may be approximately a third of the volume of the packed column.

The starting point for the design and operation of an absorption column is that the gas and liquid phases at both the upper and lower ends of the column are as close as possible to the theoretical equilibrium. Concentration differences between gas and liquid, the bubble size and the bubble rise speed greatly determine how close to the equilibrium with the surrounding water, according to Henry's law, the bubble gas is. In an ideal case, gas is in equilibrium with the circulation water supplied when exiting the top part of the reactor. It is possible to influence the bubble size with the pore or nozzle size of the gas distributor. The smaller the bubbles to which the supply gas can be disintegrated, the more slowly the bubble rises and the faster carbon dioxide absorbs. On the other hand, reducing the bubble size increases the energy consumption. If the downflow speed of water is higher than the bubble rise speed, circulation water may take gas from the reactor. Too high a relative speed between gas and liquid may reduce the separation efficiency and affect the material equilibrium. The minimum height of the bubble column ranges from 2 to 4 m, being preferably at least 3 meters, and the necessary cross-sectional area is determined based on the desirable carbon dioxide production. In other words, the height of the bubble column is such that the bubble gas achieves almost the theoretical equilibrium with the surrounding liquid phase when rising to the liquid surface from the gas distributor.

Based on the total energy efficiency and the purity of the gas product, optimum pressure applied in the absorption column is in a range of 3 to 10 bar, preferably a minimum of 4 bar absolute pressure. If the absorption pressure is lower than this level, the amount of circulation water increases and the total energy consumption of the separation process starts to increase linearly according to the pumping energy of water. It is possible to increase the recovery rate by increasing the absorption pressure, for example, to 7 bar, to achieve a recovery rate of almost 90%. Nevertheless, the specific energy consumption does not increase notably because the circulation water quantity correspondingly decreases. The specific energy consumption of the $CO_2$ separation process of the method and system according to the invention can be minimized, paying attention to both the desired recovery rate and the different combinations of the carbon dioxide concentration level of the gas product, by changing the pressure levels of absorption and desorption and the reflux ratios.

The method according to the invention can be used as a carbon dioxide recovery method of a power plant, the method being an environmentally friendly alternative to prior art chemical methods, such as the amine technology. In the method, the circulation water temperature can be maintained at a sufficiently low level using, for example, lake water or cold fresh water supplied to the plant and, in absorption, it is possible to achieve approximately an equilibrium in the bubble column. With the absorption and desorption pressure values described above, the circulation water quantity remains moderate, and a recovery rate exceeding 80% and a carbon dioxide content of gas exceeding 90% by mole can be achieved with the method. The separation efficiency of water absorption essentially improves if the concentration of the water absorption supply gas can be increased from the typical 15% by mole to 25% by mole, for example.

In the method, the actual absorption and desorption process can be carried out without adding any chemicals. A potential need of adding chemicals is only related to the purification of the circulation water from impurities originating from the gas. The method according to the invention utilizes the excellent selectivity of water to absorb carbon dioxide from gas containing mainly nitrogen.

According to an embodiment, in recovery applications, in which the target is to achieve both a high carbon dioxide gas concentration and a high recovery rate, the higher absolute pressure of 5 to 15 bar mentioned above can be applied in the absorption column.

Advantageously, the pressure energy produced in the absorption column 14 is utilized in the gas turbine 58 to recover the discharge gas energy, and in the water circulation, by means of the pressure difference due to the water level differences between the tanks. The level difference between the water levels of tanks and columns refers to the fact that, as shown in FIG. 2, the tops of the auxiliary desorption column 36 and the absorption column 14 are advantageously at a level about 4 meters lower than the bottom levels of the preliminary desorption tank 32 and the desorption column 24. With the level difference, it is possible to utilize the hydrostatic pressure difference to generate a flow between the desorption column and the auxiliary desorption column thus preventing the need of pumping the circulation water between these columns.

Figure 3:
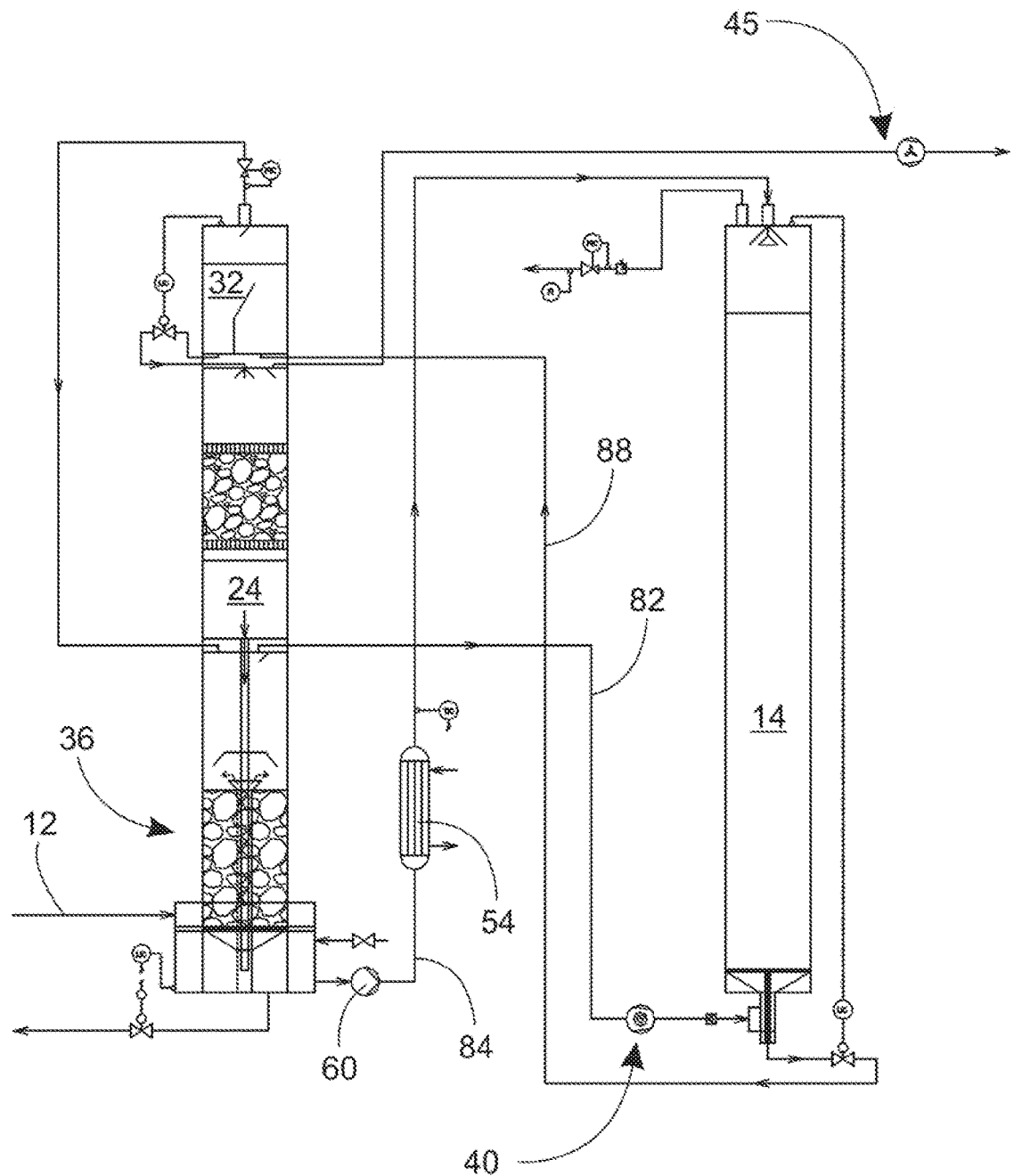
FIG. 3 shows a sub-process of the system according to another embodiment, wherein the desorption steps are adapted to take place overlapping to each other.

FIG. 3 shows another embodiment of the system according to the invention wherein the desorption steps from the process are adapted to take place vertically overlapping. The system can be designed to suit both small and large scale applications. Such an embodiment is particularly advantageous in small-scale applications wherein the steps can be implemented within two vertical pipes, for example. The pipe ends and trays can be made of pipe flanges, for example. In the method, the practical height of the absorption column can range between 8 and 12 m. Since desorption of carbon dioxide from the circulation water takes place faster than absorption, the height requirement of columns can be lower for these. In the method, the $CO_2$ absorption capacity of the circulation water in the process conditions applied determines the flow rate ratio between the circulation water and the flue gas that is "considered good for its part". Another important factor for the flow ratio is the $CO_2$ concentration achieved from desorption.

The method and the system according to the invention can be best used in industrial applications in which cooling water and gas or process gas are available at a carbon dioxide concentration exceeding about 20% by mole. The process according to the invention can be designed and dimensioned according to the necessary $CO_2$ concentration and quantity. A great need of carbon dioxide (kg/s) requires a great quantity of circulation water and thus large pipe and equipment diameters, whereas the heights of the bubble columns are not affected by the capacity. If the $CO_2$ concentration of gas is below 20% by mole, pre-separation carried out during pressurization can remarkably reduce the specific energy consumption of the separation process.

According to an embodiment, a catalyst can be utilized in the method in the absorption and desorption steps to accelerate hydration. A metal catalyst, such as palladium (Pd), platinum (Pt), rhodium (Rh), nickel (Ni) or ruthenium (Ru), can be used as the catalyst. It has been shown [Gaurav A. Bhaduri and Lidija Šiller, *Nickel Nanoparticles Catalyse Reversible Hydration of Carbon Dioxide for Mineralization Carbon Capture and Storage*, Catalysis Science & Technology, 2013, 3, 1234-1239.] that a nickel catalyst catalyzes the reaction of water and carbon dioxide to produce carbonic acid and vice versa: $CO_2 + H_2O \Leftrightarrow HCO_3^- + H^+$. A catalyst used in the method can accelerate absorption and desorption of carbon dioxide in and from the circulation water as well as increase the amount of carbon dioxide dissolved in water, for example. In the process method, the catalyst can be carried along with the circulation water as small particles (nanoparticles, for example), which can be separated from the circulation water using a magnetic field, for example, if the material of the catalyst is magnetic. A metal catalyst can also be installed in the process steps as an integral component, such as a coating, packing elements or surface, lamellar or grating constructions made of sheet material or net constructions made of metal wire. It is also possible to use enzyme catalysts, such as the carbonic anhydrase enzyme, in the method.

According to a second embodiment, nozzles, such as conical nozzles, can be used in the method to create a momentary vacuum pulse in the circulation water flow. At the same time, vacuum pulses can also be utilized to uniformly distribute the circulation water to the columns of the process method. In the method, the pressure difference between the preliminary desorption step and the desorption step, existing in the circulation water, can be utilized in the circulation water supply to the desorption step, to create a momentary dynamic vacuum pulse in the expanding conical section of the conical nozzle, for example. Conical nozzles enable uniform distribution of circulation water to the desorption tank. Other types of mechanical methods creating a vacuum pulse or an overpressure pulse can also be utilized in the absorption and desorption steps of the method, to momentarily affect the higher absorption or desorption pressure conditions. In the absorption column, spiral nozzles, for example, can be utilized to uniformly distribute the circulation water in the column.

Circulation water passes through a spiral nozzle efficiently since the liquid flow along the spiral is not reduced and thus the pressure difference through the nozzle is small. Thus, the small pressure difference of the nozzle decreases the pressure requirement of the pump feeding the absorption tank.

According to a third embodiment, a gas disintegration technique implemented with a membrane can be utilized for disintegrating gas at the bottom of the absorption column. Such a technique is most commonly used in aeration tanks. When feeding gas to the bottom of the pressurized absorption column, it should be noted that the gas compresses under pressure, whereupon its volume changes proportionally to the pressure applied in the absorption column. Membrane disintegrators can be membrane disintegrators made of (EPDM) rubber, for example. Membrane disintegrators can create bubbles with a diameter ranging from about 1 mm to about 2 mm in the absorption column at an overpressure of 3.5 bar. A membrane creates a substantially small pressure difference for the gas flow. An example of a membrane disintegrator is the E-Flex hose gas disintegrator, with which gas can be distributed with a gas distribution tray made of several hose circles at the bottom of a round absorption column. These hose circles can be designed to be disposed overlapped in the gas distribution tray and interlaced for the circumferential diameter, based on the uniformity requirement of gas distribution at the bottom of the absorption column. From the absorption column, the circulation water can be removed via the bottom cone under the gas disintegrator tray to prevent access of gas to the circulation water discharged from the absorption column. Other gas disintegrator models can also be used in the method, such as saddle and hose disintegrators. Other types of location solutions for the disintegrator tray can also be combined in this gas disintegrator tray of the method.

According to a fourth embodiment, gas baffle plates or parallel absorption columns can be utilized in the absorption column in the method according to the invention. High vertical turbulence of flows can be generated in a bubble absorption column having a large cross-sectional area, which is disadvantageous in the method regarding the performance of the absorption column. To prevent this, vertically running intermediate baffle plate walls can be designed within the absorption column, or the cross-sectional area required for the capacity can be built using several adjacent absorption columns.

According to a fifth embodiment, in the preliminary desorption step of the method, gas desorbs from the circulation water as very small bubbles to the circulation water. In the preliminary desorption tank, a dividing wall can be utilized to remove these bubbles from the circulation water prior to supplying the circulation water to the desorption step.

According to a sixth embodiment, an additional surface area created by packing elements can be utilized in the desorption columns in the method. Within the desorption column, these enable achievement of uniform distribution of gas and water as well as a small flow resistance for gas and water flows. Carbon dioxide dissolved in water in the desorption column and the auxiliary desorption column desorbs from water through the liquid/gas boundary surface, to the gas phase. In the desorption column and/or the auxiliary desorption column of the method according to the invention, this liquid area between gas and liquid can be increased with packing elements, to accelerate the transfer of the $CO_2$ gas volume from the circulation water to the gas phase during desorption. At the same time, packing elements also increase the desorption time of gas to become removed from water to the gas phase. Desorption of carbon dioxide from the circulation water is quick when packing elements are used in the columns. Suitable packing elements for this purpose are ring pall type packing elements, for example. These packing elements do not create a high flow resistance to the gas flow or the liquid flow, while they at the same time uniformly distribute gas and circulation water flows over the entire cross-sectional area of the column. Packing elements can be utilized in the desorption tank of the method as well as in the auxiliary desorption column (post-desorption column). It should be noted that several column types and packing element models exist that are suited to the method.

According to a seventh embodiment, besides an electric motor, a steam turbine or a gas turbine can alternatively be used in the method for providing the driving energy for the gas compressors. In the method according to the invention, continuous operation is advantageously required of the gas compressors. In the method, besides an electric motor, gas compressors can also be driven assisted by a steam turbine or a gas turbine, in which case the steam pressure through the turbine can reduce the direct electricity consumption of the compressor. In several turbocompressor models, such as the IHI turbocompressor, this is selectable as an option in the compressor. Besides the steam pressure, the pressure energy of gas can be utilized in compressors as an energy source.

According to an eight embodiment, a flue gas fan can be utilized in the method in feeding flue gas to the process. Using a separate flue gas fan, flue gas can be supplied at a slight overpressure to a flue gas cleaner, possibly required in the process, and further to the suction side of the gas compressor via the auxiliary desorption column. In this way, it is possible to improve the delivery of gas to the gas compressor on its suction side.

According to a ninth embodiment, a centrifugal classifier can be utilized in the method according to the invention for separating carbon dioxide prior to the supply to the absorption column. If a great amount of flue gas with a low $CO_2$ concentration is processed, this is a difficult situation regarding the performance of the method. In such cases, the gas quantity can be decreased with a centrifugal classifier during the pressurization of gas supplied to the absorption column. Classification of the carbon dioxide bearing gas supplied with the centrifugal separation process is based on the higher molecular average weight of carbon dioxide compared to the rest of the gas, due to which, carbon dioxide settles more in the edge area of the cylinder in the centrifugal field of the centrifugal classifier compared to the other gases. From the centrifugal classifier, carbon dioxide gas is removed from the outer circumference of the cylinder at a higher $CO_2$ concentration compared to its concentration in the gas flow supplied to the centrifugal classifier, and the rest of the gas is removed from the centrifugal classifier at a lower carbon dioxide content through the center thereof. At the same time, the centrifugal classifier mostly pressurizes only the carbon dioxide rich gas discharged from the outer circumference, to a high pressure, which is also sufficient for the pressurization of the supply gas required in the absorption column. The rotational energy of gas discharged from the center of the centrifugal classifier can be partly reutilized in the rotational movement of the classifier, after which the gas with a lower carbon dioxide content can be sent back to a chimney, for example. For example, the centrifugal classifier can be similar to the one shown in FIG. 5 in publication Harazim, 2006 [Harazim Wolfgang 2006. Method for separating gas mixtures and a gas centrifuge for carrying out the method. United States Patent Application US2006/0230933 A1, 19, Oct. 2006. 9 p.].

The separation of carbon dioxide from the gas flow carried out in this way with the centrifugal classifier reduces the total quantity of gas to be pressurized and supplied to the absorption column, thus improving the energy economy of the method. In addition, increasing the carbon dioxide content of gas supplied to the absorption column, carried out in this way, increases the absorption rate of carbon dioxide, according to the partial pressure of carbon dioxide, into the circulation water.

According to a tenth embodiment, a vacuum can be advantageously generated in the desorption step of the method with a by-pass duct fan or, on a larger scale, with a turbofan. Depending on the model, these can achieve vacuums exceeding 0.4 atm. In small-scale applications, gas compression can be carried out in the absorption step with an advantageously silent and oilfree spiral compressor. Commercial turbocompressors can only be found for gas flows exceeding 10 $m^3$/min, which perform more efficiently in compression.

According to an eleventh embodiment, serial centrifugal pumps, the delivery heights of which are sufficient for a circulation water pump feeding the absorption column, can be utilized in small scale pumping of circulation water (from 20 l/min upwards). On a larger scale, many other centrifugal pump models are also available, the delivery heights of which are sufficient for this application.

Regarding its energy consumption, the method is competitive with current methods; however, the water absorption method is free of chemicals, which improves the commercialization possibilities of water absorption. The most potential applications of the invention are:

pH adjustment in the processes of the chemical industry and the pulp and paper industry; for example, flotation of carbon and sulfide minerals for pH adjustment, and as flotation gas, use of carbon dioxide in thermal treatment instead or alongside with steam to increase the resistance of wood against moisture and biodegradation, as reactive gas in the modification and protection of wood with pyrolytic gases, separation of carbon dioxide from biocombustion flue gases for additional nutrient in greenhouses, in the paper production, for providing carbon dioxide required in the manufacture of precipitated calcium carbonate (PCC) from flue gas, which makes it possible to give up purchased carbon dioxide and the amine technology. The method is integratable to novel PCC in-line manufacturing, wherein carbon dioxide is directly supplied to the fiber suspension pipe flow as saturated liquid or gas.

The invention claimed is:

1. A method for recovering carbon dioxide from gas, which method comprising steps of:
    pressurizing gas,
    feeding pressurized gas and water used as a solvent from an auxiliary desorption column to an absorption column to 3 to 10 bar absolute pressure,
    feeding water received from the absorption column and carbon dioxide absorbed therein to a desorption column for recovering carbon dioxide from the water,
    recirculating water exiting the desorption column to the absorption column,
    recovering carbon dioxide exiting the desorption column,
    feeding at least part of the gas to the auxiliary desorption column prior to pressurizing the gas, and
    sending water exiting the desorption column back to the auxiliary desorption column.

2. A method according to claim 1, the method comprising a step of liquefying and distilling carbon dioxide exiting the desorption column for recovery.

3. A method according to claim 1, wherein the pressure applied in the desorption column is at a level of 0.2 to 1.1 bar.

4. A method according to claim 1, wherein the pressure applied in the auxiliary desorption column is at a level of 0.9 to 1.2 bar.

5. A method according to claim 1, the method comprising a step of delivering gas discharged from the top of the absorption column to a gas turbine for recovering the pressure energy.

6. A method according to claim 1, the method comprising a step of using a metal catalyst in the method in the absorption and desorption steps to accelerate hydration, wherein the metal catalyst used is one of the following: Pd, Pt, Rh, Ni or Ru.

7. A method according to claim 1, the method comprising a step of using conical nozzles in the method for creating a momentary vacuum pulse in the circulation water flow in the desorption column.

8. A method according to claim 1, the method comprising a step of using spiral nozzles in the method for uniformly distributing the circulation water in the absorption column.

9. A method according to claim 1, the method comprising a step of using a disintegration technique implemented with a membrane at the bottom of the absorption column for disintegrating gas to bubbles.

10. A method according to claim 1, the method comprising a step of using a steam turbine in the method to assist or replace an electric motor used for generating the driving energy for gas compressors.

11. A method according to claim 1, the method comprising a step of using a fan in the method to feed the gas to the auxiliary desorption column.

12. A method according to claim 1, the method comprising a step of using a centrifugal classifier in the method to separate carbon dioxide prior to the supply to the absorption column.

13. A method according to claim 1, the method comprising a step of feeding carbon dioxide absorbed in water received from the absorption column to a preliminary desorption tank and sending the gas exiting therefrom back to the auxiliary desorption column.

14. A method according to claim 13, wherein the pressure applied in the preliminary desorption tank is at a level of 1.3 to 4.0 bar.

\* \* \* \* \*